US012780679B2

(12) United States Patent
Zhao et al.

(10) Patent No.: US 12,780,679 B2
(45) Date of Patent: Nov. 3, 2026

(54) POROUS INTERMETALLIC COMPOUNDS, PREPARATION METHOD AND APPLICATION THEREOF

(71) Applicant: ZHEJIANG UNIVERSITY OF TECHNOLOGY, Hangzhou (CN)

(72) Inventors: Jia Zhao, Hangzhou (CN); Xiaonian Li, Hangzhou (CN); Yuxue Yue, Hangzhou (CN); Saisai Wang, Hangzhou (CN); Yihan Zhu, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 1067 days.

(21) Appl. No.: 17/958,743

(22) Filed: Oct. 3, 2022

(65) Prior Publication Data

US 2024/0002248 A1 Jan. 4, 2024

(30) Foreign Application Priority Data

Jun. 30, 2022 (CN) ......................... 202210769457.3
Jun. 30, 2022 (CN) ......................... 202210769460.5

(51) Int. Cl.
*C01G 3/00* (2006.01)
*B22F 9/04* (2006.01)

(52) U.S. Cl.
CPC ................ *C01G 3/006* (2013.01); *B22F 9/04* (2013.01); *C01G 3/00* (2013.01); *B22F 2009/043* (2013.01); *C01P 2006/12* (2013.01)

(58) Field of Classification Search
CPC .............. C01G 3/006; C01G 3/00; B22F 9/04
See application file for complete search history.

(56) References Cited

PUBLICATIONS

Saldanha "Generalized one-pot synthesis of copper sulfide, selenide-sulfide, telluride-sulfide nanoparticles", Chemistry of Materials, vol. 26/Issue 3, 1442-1449 (Year: 2014).*

* cited by examiner

*Primary Examiner* — James A Fiorito
(74) *Attorney, Agent, or Firm* — MUNCY, GEISSLER, OLDS & LOWE, P.C.

(57) ABSTRACT

The invention discloses a porous intermetallic compound and preparation method and application thereof. The pore structure of the porous intermetallic compound includes micropores and mesopores, and the micropores and mesopores are distributed in disorder, wherein the content of the micropores accounts for 6-68%, and the content of mesopores accounts for 32-92%; the specific surface area of the porous intermetallic compound is 50-1600 $m^2/g$, and the porous intermetallic compound is a porous copper silicide intermetallic compound or porous copper-chalcogen intermetallic compound. The invention provides preparation methods of the porous intermetallic compound, and also provides an application of the porous intermetallic compound as a catalyst in the reaction of acetylene hydrochlorination to synthesize vinyl chloride. The porous intermetallic compound catalyst prepared by the invention can carry out the acetylene hydrochlorination reaction in a wide space velocity range, and has good catalytic activity.

17 Claims, 3 Drawing Sheets

POROUS INTERMETALLIC COMPOUNDS, PREPARATION METHOD AND APPLICATION THEREOF

FIELD OF THE INVENTION

The invention relates to a porous intermetallic compound and its preparation method and application in the reaction of synthesizing vinyl chloride.

BACKGROUND OF THE INVENTION

Polyvinyl chloride (PVC) is the third largest general-purpose plastic, generally obtained by the polymerization of the monomer vinyl chloride. In the production process of vinyl chloride produced by calcium carbide method, the catalyst is deactivated due to the loss of the sublimation of mercury, which seriously endangers ecological environment and people's life and health. Therefore, the development of green mercury-free catalysts for the synthesis of vinyl chloride by calcium carbide method has extremely important practical significance.

Since mercuric chloride will cause serious pollution to the environment, and polyvinyl chloride synthesized with it contains a small amount of mercury, which limits the application of polyvinyl chloride, people gradually focus on mercury-free chlorides. Among them, noble metal chlorides show the best catalytic activity, metals such as gold (ACS Catalysis.2018,8,8493-8505; Journal of Catalysis.2018,365, 153-162; Journal of Catalysis.2017,350,149-158), palladium (Petroleum Science and Technology. 2010, 28, 1825-1833), ruthenium (RSC Advances. 2013, 3, 21062; Applied Catalysis B: Environmental. 2016, 189, 56-64) have been reported as the active component and show higher catalytic activity than mercury. However, the above-mentioned mercury-free catalysts have problems such as low activity, poor selectivity, poor long-term stability or low economic efficiency, and cannot yet meet the needs of industrial production. In recent years, copper has become one of the hot spots of mercury-free catalysts for the synthesis of vinyl chloride by calcium carbide due to its cheapness and abundance of resources. At present, there is no copper catalyst that can be applied to the large-scale industrial production of vinyl chloride, mainly due to the poor long-term stability of the copper active center.

Since Dash (J. Appl. Phys., 1956, 27, 1193-1195) first used copper to modify dislocations in silicon in 1956, the Cu—Si interaction has been extensively studied for its microelectronic and catalytic applications. Compared with other silicide systems, copper silicide is an intermetallic compound that forms at relatively low processing temperature and has high mechanical strength and steady chemical property, and the electronic structure of the material can be controlled by regulating the type and degree of defects on the surface and bulk phase of copper silicate. At present, there is no copper silicide intermetallic catalyst for acetylene hydrochlorination.

Copper-chalcogen compounds are an important class of transition metal intercompounds, and also a class of multi-functional narrow-bandgap P-type semiconductor multi-functional crystal materials with good chemical stability, which are widely used in more and more fields, such as light-emitting diodes, photocatalysts, photothermal diagnosis and treatment, fluorescent materials, electroluminescent devices, sensors, electrochemical cells and solar cells. At present, the use of non-supported crystalline materials to directly catalyze the hydrochlorination of acetylene has not been reported, nor has there been any report on the use of copper-chalcogen intermetallic catalysts for the hydrochlorination of acetylene.

SUMMARY OF THE INVENTION

The first object of the present invention is to provide a porous intermetallic compound with abundant pore structure and defect sites.

The second object of the present invention is to provide preparation methods of porous intermetallic compounds with green and simple preparation process and low preparation cost.

The third object of the present invention is to provide an application of the porous intermetallic compound as a catalyst in the reaction of acetylene hydrochlorination to synthesize vinyl chloride.

In order to achieve the above-mentioned purposes of the invention, the present invention provides the following technical solutions:

In a first aspect, the present invention provides a porous intermetallic compound, the pore structure of the porous intermetallic compound includes micropores and mesopores, and the micropores and mesopores are distributed in disorder, wherein the content of the micropores accounts for 6-68%, and the content of mesopores accounts for 32-92%; the specific surface area of the porous intermetallic compound is 50-1600 $m^2/g$; the porous intermetallic compound is a porous copper silicide intermetallic compound or porous copper-chalcogen intermetallic compound; in the porous copper silicide intermetallic compound, the molar ratio of copper to silicon is 0.4~25:1; in the porous copper-chalcogen intermetallic compound, the chalcogen is one or more of sulfur, selenium and tellurium, and the chemical formula of the porous copper-chalcogen intermetallic compound is $Cu_xS_ySe_mTe_n$, wherein x>0, y, m, n≥0, and the molar ratio of copper to chalcogen, i.e. x/(y+m+n)=1:0.01~5.

Preferably, in the porous copper silicide intermetallic compound, the content of micropores accounts for 10-40%, and the content of mesopores accounts for 60-90%.

Preferably, the molar ratio of copper to silicon in the porous copper silicide intermetallic compound is 0.4-5:1.

Preferably, the specific surface area of the porous copper silicide intermetallic compound is 400-600 $m^2/g$.

Preferably, in the porous copper-chalcogen intermetallic compound, the molar ratio of copper to chalcogen is 1:0.2-5.

In a second aspect, the present invention provides a preparation method of a porous intermetallic compound, which comprises:

1) mixing a copper precursor with compound A, wherein the mass ratio of the precursor to the compound A is 1:0.8~1.55, placing the resulting mixture in an inert atmosphere or air atmosphere, and fully grinding it in a planetary ball mill; wherein the compound A is a silicon-containing compound or an inorganic or organic chalcogen-containing compound;
2) putting the ground material obtained in step 1) into a constant temperature microwave shaker for microwave digestion treatment, wherein the frequency of the microwave digestion treatment is 300 MHz~300 GHz, and the treatment time is 0.1~24 h;
3) placing the mixture obtained in step 2) in a Joule heating furnace full of an inert gas for rapid heating and cooling treatment by carbon thermal shock method, in which the temperature of the carbon thermal shock method is 200~3200° C., the duration of the shock is 0.05-3 seconds, and the heating/cooling rate is 10~2000° C. per second;

4) placing the material obtained in step 3) in deionized water for ultrasonic washing, and then subjecting the material to vacuum drying to obtain the porous intermetallic compound.

The copper precursor described in step 1) of the present invention is selected from at least one of copper powder, copper chloride, copper nitrate, copper sulfate, copper oxide, cuprous oxide, copper hydroxide, copper phosphide, copper sulfide, copper selenide, and copper acetate; preferably selected from at least one of copper powder and copper chloride.

The silicon-containing compound described in the present invention is selected from one or more of nano-silica powder, diatomaceous earth, silicon acetate, trimethylsilimidazole, silicon dioxide, silica, silicic acid, and boron silicide.

The chalcogen-containing compound described in the present invention is selected from one or more of inorganic and organic compounds containing sulfur, selenium and/or tellurium.

Preferably, the sulfur-containing compound is one or more of organic and inorganic sulfur-containing compounds. Specifically, the organic sulfur-containing compound includes thioglycolic acid, thioacetamide, 1,3-bis(thioacetic acid-S-n-propyl) imidazolium bromide, propanethiol, 2-propylthiol, sodium methanethiolate, n-butyl mercaptan, allyl mercaptan, n-dodecane mercaptan, cyclohexane mercaptan, methyl sulfide, methyl ethyl sulfide, thiourea and sulfur tetrachloride; and the inorganic sulfur-containing compound includes sulfuric acid, sodium sulfide, tin sulfide, tungsten sulfide, selenium disulfide, phosphorus pentasulfide, sublimated sulfur, silicon sulfide, tellurium disulfide and selenium telluride.

Preferably, the selenium-containing compound is one or more of organic and inorganic selenium-containing compounds. Specifically, the organic selenium-containing compound includes dimethyl selenium, selenophene, dimethyl diselenide, selenium tetrachloride, selenophene and triphenylphosphine selenide; and the inorganic selenium-containing compound includes selenium powder, copper selenide, selenium dioxide, Selenium acid solution, iron selenide, selenium disulfide and selenium telluride.

Preferably, the tellurium-containing compound is one or more of organic and inorganic tellurium-containing compounds. Specifically, the organic tellurium-containing compound includes di-tert-butyl tellurium, diphenyl tellurium, diethyl tellurium, tellurium tetrachloride and tellurium isopropanol. The inorganic tellurium-containing compound includes tellurium powder, tellurium oxide, copper telluride, ammonium tellurate, telluric acid, tellurium disulfide, and selenium telluride.

Preferably, the inert atmosphere includes helium, nitrogen or argon.

Preferably, in step 1), the porous intermetallic compound is a porous copper silicide intermetallic compound, the ball milling speed is 100-100,000 rpm, and the ball milling time is 0.5-24 h.

Preferably, in step 1), the porous intermetallic compound is a porous copper-chalcogen intermetallic compound, the ball milling speed is 100-12000 rpm, and the ball milling time is 0.5-5 h. More preferably, the ball milling speed is 2000~12000 rpm, and the ball milling time is 1-5 h.

Preferably, the porous intermetallic compound is a porous copper-chalcogen intermetallic compound, in step 2), the frequency of the microwave digestion treatment is 300 MHz-300 GHz, and the treatment time is 1-5 h.

Preferably, the porous intermetallic compound is a porous copper-chalcogen intermetallic compound, in step 3), the temperature of the carbon thermal shock is 500-3200° C., the shock duration is 0.1-3 seconds, and the heating/cooling rate is 100-2000° C. per second.

Preferably, the temperature of vacuum drying in step 4) is 80-120° C., and the time of vacuum drying is 2-12 h.

In a third aspect, the present invention provides another method for preparing a porous copper silicide intermetallic compound, comprising the following steps:

a) mixing a copper-containing precursor with a silicon-containing compound, wherein the mass ratio of the precursor to the silicon-containing compound is 1:0.8~1.4, and then subjecting the obtained mixture to microwave digestion treatment to obtain a silicon-copper skeleton material, wherein the frequency of the microwave digestion treatment is 300 MHz~300 GHz, and the treatment time is 0.1-24 h;

b) subjecting the silicon-copper skeleton material to a solid-state electrolysis process in an electrolytic cell, and collecting the cathode deposits to obtain the porous copper silicide intermetallic compound; wherein the electrolyte is NASICON oxide solid electrolyte, the electrode anode is made of CW104C copper alloy, the cathode is made of carbon nanofibers, the electrolysis time of the solid-state electrolysis process is 0.5~3 h, and the current density is 10-500 $mA\cdot cm^{-2}$.

Preferably, in step a), the treatment time is 0.5-5 h.

Preferably, in step b), the electrolysis time is 0.5-3 h, and the current density is 100-500 $mA\cdot cm^{-2}$.

The selection of the copper-containing precursor and the silicon-containing compound described in step a) is the same as that in the second aspect, and will not be repeated here.

In a fourth aspect, the present invention provides an application of the porous intermetallic compound as a catalyst in the reaction of acetylene hydrochlorination to synthesize vinyl chloride.

Preferably, the application is as follows: introducing raw material gases hydrogen chloride and acetylene into a fixed-bed reactor loaded with the porous intermetallic compound, and performing the reaction at a reaction temperature of 80-400° C. to generate vinyl chloride.

More preferably, the porous intermetallic compound is a porous copper silicide intermetallic compound, and the reaction temperature is 80-300° C.

More preferably, the porous intermetallic compound is a porous copper silicide intermetallic compound, the molar ratio of the two raw material gases is $n(HCl)/n(C_2H_2)=0.8$-1.15/1, and the space velocity of acetylene is 30-370 $h^{-1}$.

More preferably, the porous intermetallic compound is a porous copper-chalcogen intermetallic compound, the molar ratio of the two raw material gases is $n(HCl)/n(C_2H_2)=0.8$-1.2/1, and the space velocity of acetylene is 30-740 $h^{-1}$.

Compared with the prior art, the beneficial effects of the present invention are:

(1) The present invention provides a porous copper silicide intermetallic compound, which has high thermal stability, chemical stability and mechanical strength, a high specific surface area, rich pore structure (including micropores, mesopores), disordered microscopic surface and dispersed defect sites, these structural features make it have excellent activity and can be directly used as a catalyst, the regeneration of deactivated catalyst is simple and it can be regenerated for more than five times, and it is environmentally friendly and does not cause pollution.

(2) The present invention also provides two preparation methods of porous copper silicide intermetallic compounds. The synthetic raw materials of the preparation methods provided by the present invention have abundant resources and low price, the methods have green and simple preparation process, low production cost and little harm to the environment; further in the preparation process, the physical and chemical properties of the compound can be controllably modulated by modulating the copper-containing precursor and the silicon-containing compound.

(3) The porous copper-chalcogen intermetallic compound of the present invention has properties between ionic compounds and alloys, a high specific surface area, abundant pore structure and dispersed defect sites.

(4) The preparation method of the porous copper-chalcogen intermetallic compound of the present invention has low production cost and little environmental harm due to abundant and low-priced synthetic raw material resources, and green and simple preparation process.

(5) The porous copper silicide intermetallic compound and porous copper-chalcogen intermetallic compound prepared by the present invention can carry out the acetylene hydrochlorination reaction in a wide space velocity range, and has good catalytic activity and catalytic stability.

DETAILED DESCRIPTION OF THE INVENTION

The present invention is described below with specific examples. It is necessary to point out that the examples are only used to further illustrate the present invention, but should not be construed as limiting the protection scope of the present invention, and the present invention is not limited thereto in any way. Those skilled in the art can make some non-essential improvements and adjustments based on the content of the above invention.

Example 1

1) 22.6 g of nano-silicon powder were added to 22 g of copper powder, and the mixture was processed in a planetary ball mill under air atmosphere at a ball milling speed of 20,000 rpm for 1 hour to fully mix the copper powder and the silicon powder;

2) the above mixture was placed in a microwave shaker for microwave digestion treatment, the frequency of the microwave digestion treatment was 1500 MHz, and the treatment time was 2 h;

3) the above mixture was placed in a Joule heating furnace under nitrogen atmosphere, the temperature of the carbon thermal shock was 3200° C., the shock duration was 120 milliseconds and the heating/cooling rate was 500° C. per second.

Figure 1:
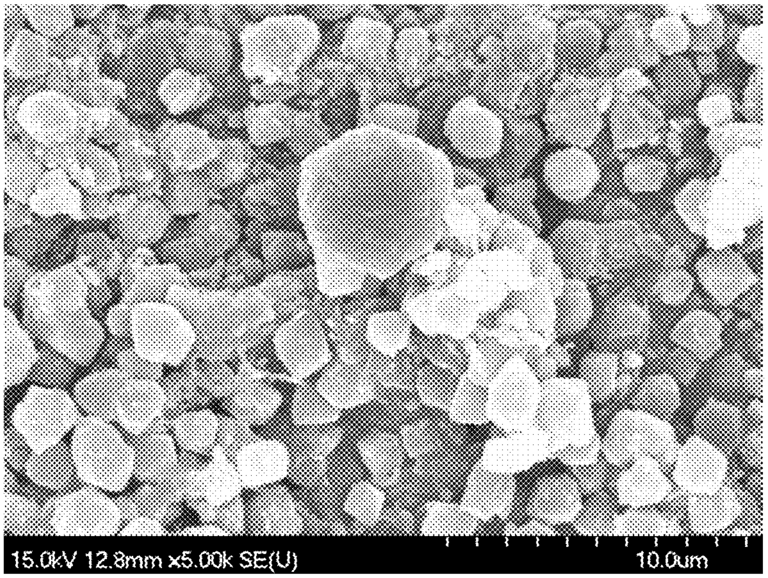
FIG. 1: Scanning electron microscope image of the material prepared in Example 1.
Figure 3:
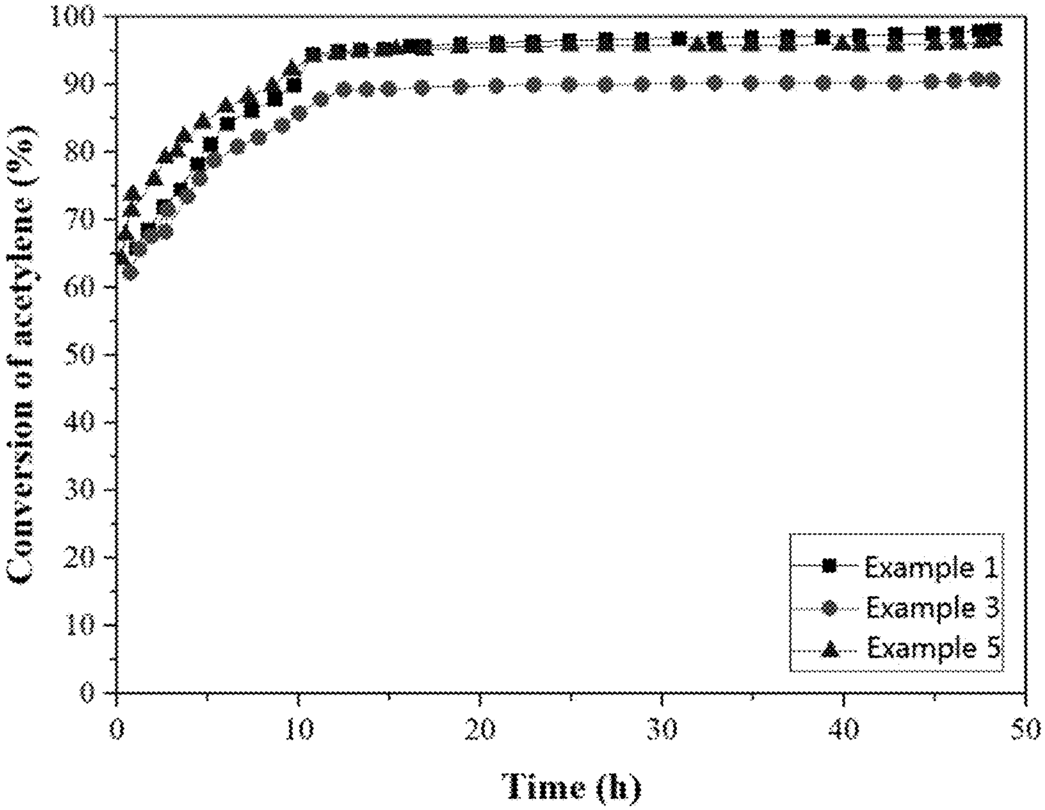
FIG. 3: Reaction performance diagram of the materials prepared in Example 1, Example 3 and Example 5.

4) the above material was ultrasonically washed with deionized water, and vacuum dried at 80° C. for 12 hours to obtain a porous copper silicide intermetallic compound material. The physical parameters are shown in Table 1, and the scanning electron microscope image is shown in FIG. 1;

5) evaluation of acetylene hydrochlorination reaction in a fixed bed reactor: the effects of temperature and space velocity on the catalytic performance of the catalyst were investigated respectively. Under the condition of acetylene space velocity of 30-740 $h^{-1}$, the effect of acetylene space velocity on the catalytic performance of the catalyst was investigated. Then, the effect of temperature on the catalytic activity of the catalyst was investigated at 120-300° C., and the results are shown in Table 1; it was found that the effect was the best when the reaction was carried out under the conditions that the reaction temperature was 220° C., the acetylene space velocity was 40 $h^{-1}$, and the molar ratio of hydrogen chloride to acetylene was 1.05:1, the reaction conversion rate was 98.3% and the selectivity of vinyl chloride was 99% when the reaction initially reached a stable state, and the stability of the catalyst is shown in FIG. 3.

Example 2

1) 15.7 g of boron silicide and 5 ml of silicic acid were added to 15 g of cupric chloride dihydrate powder, and the mixture was processed in a planetary ball mill under nitrogen atmosphere at a ball milling speed of 100,000 rpm for 0.5 h to fully mix the copper source and the silicon source;

2) the above mixture was placed in a microwave shaker for microwave digestion treatment, the frequency of the microwave digestion treatment was 300 GHz, and the treatment time was 0.5 h;

3) the above mixture was placed in a Joule heating furnace under nitrogen atmosphere, the temperature of the carbon thermal shock was 2800° C., the shock duration was 2500 milliseconds, and the heating/cooling rate was 1000° C. per second.

4) the above material was ultrasonically washed with deionized water, and vacuum dried at 120° C. for 12 hours to obtain a porous copper silicide intermetallic compound, whose physical parameters are shown in Table 1;

5) evaluation of acetylene hydrochlorination reaction in a fixed bed reactor: the acetylene hydrochlorination reaction was carried out at 280° C., acetylene space velocity was 70 $h^{-1}$, and the molar ratio of hydrogen chloride: acetylene was 1:1. When the reaction initially reached a stable state, the reaction conversion rate was 92.7% and the selectivity of vinyl chloride was 99%.

Example 3

1) 13.5 g of diatomite were added to 12 g of copper powder, and the mixture was placed in a microwave shaker for microwave digestion treatment, wherein the frequency of the microwave digestion was 10 GHz and treatment time was 4 h, to obtain a silicon copper skeleton material;

2) the silicon-copper skeleton material was subjected to solid-state electrolysis treatment in an electrolytic cell, the electrolyte was NASICON type oxide solid electrolyte, the electrode anode was made of CW104C copper alloy, the cathode was made of carbon nanofibers, the current density was 100 mA·cm$^{-2}$, the electrolysis time was 0.5 h, and finally a porous copper silicide intermetallic compound material was obtained, and its physical parameters are shown in Table 1;

3) evaluation of acetylene hydrochlorination reaction in a fixed bed reactor: the acetylene hydrochlorination reaction was carried out at 210° C., acetylene space velocity was 100 h$^{-1}$, the molar ratio of hydrogen chloride: acetylene was 1:1.1, and when the reaction initially reached a stable state, the reaction conversion rate was 90.5% and the selectivity of vinyl chloride was 99%.

Example 4

Figure 2:
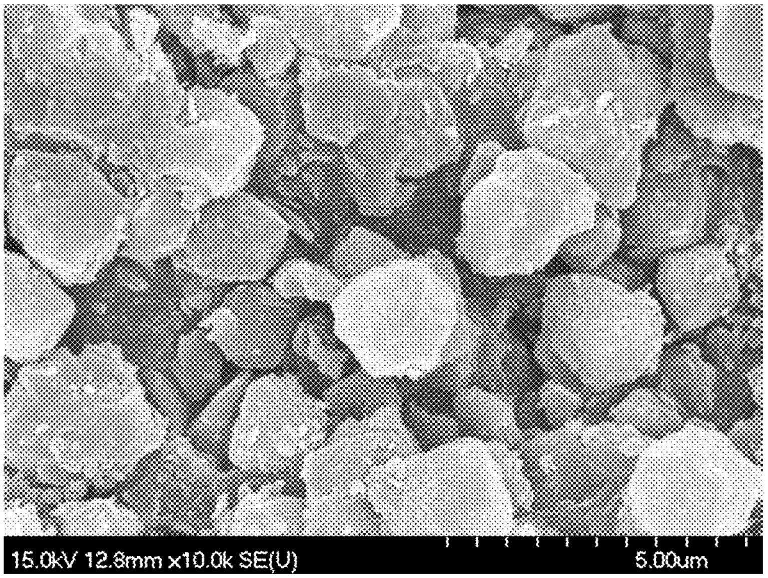
FIG. 2: Scanning electron microscope image of the material prepared in Example 4.

1) 17.5 g silicon acetate and 1.5 g silicic acid were added to 20 g copper acetate monohydrate powder, and the mixture was placed in a microwave shaker for microwave digestion treatment, wherein the frequency of the microwave digestion was 800 MHz, treatment time was 4 h, to obtain a silicon copper framework material;

2) the silicon-copper skeleton material was subjected to solid-state electrolysis treatment in an electrolytic cell, the electrolyte was NASICON type oxide solid electrolyte, the electrode anode was made of CW104C copper alloy, the cathode was made of carbon nanofibers, the current density was 500 mA·cm$^{-2}$, the electrolysis time was 0.5 h, and finally a porous copper silicide intermetallic compound material was obtained, and its physical parameters are shown in Table 1, and the scanning electron microscope image is shown in FIG. 2;

3) evaluation of acetylene hydrochlorination reaction in a fixed bed reactor: the acetylene hydrochlorination reaction was carried out at 270° C., acetylene space velocity was 370 h$^{-1}$, and the molar ratio of hydrogen chloride: acetylene was 1:12, and when the reaction initially reached a stable state, the reaction conversion rate was 95% and the selectivity of vinyl chloride was 98%.

Example 5

1) 20 g silicon dioxide powder were added to 20 g copper sulfide powder, and the mixture was placed in a microwave shaker for microwave digestion treatment, wherein the frequency of the microwave digestion treatment was 200 GHz, treatment time was 1 h, to obtain a silicon copper framework material;

2) the silicon-copper skeleton material was subjected to solid-state electrolysis treatment in an electrolytic cell. The electrolyte was NASICON type oxide solid electrolyte, the electrode anode was made of CW104C copper alloy, the cathode was made of carbon nanofibers, the current density was 200 mA·cm$^{-2}$, the electrolysis time was 3 h, and finally a porous copper silicide intermetallic compound material was obtained, and its physical parameters are shown in Table 1;

3) evaluation of acetylene hydrochlorination reaction in a fixed bed reactor: the acetylene hydrochlorination reaction was carried out at 300° C., acetylene space velocity was 30 h$^{-1}$, and the molar ratio of hydrogen chloride: acetylene was 0.9:1.2, and when the reaction initially reached a stable state, the reaction conversion rate was 97.9% and the selectivity of vinyl chloride was 99%.

Comparative Example 1

The fixed bed reactor was charged with copper silicide purchased from Aladdin, and the acetylene hydrochlorination reaction was evaluated under the following conditions: the reaction temperature was at 230° C., the acetylene space velocity was 50 h$^{-1}$, and the molar ratio of hydrogen chloride:acetylene was 1:1.2. When the reaction initially reached a stable state, the reaction conversion rate was 12% and the selectivity of vinyl chloride was 99%.

Comparative Example 2

1) 22.6 g of nano-silicon powder were added to 22 g of copper powder, and the mixture was processed in a planetary ball mill under air atmosphere at a ball milling speed of 20,000 rpm for 1 hour to fully mix the copper powder and the silicon powder;

2) the above mixture was placed in a microwave shaker for microwave digestion treatment, the frequency of the microwave digestion treatment was 1500 MHz, and the treatment time was 2 h;

3) the above mixture was irradiated with X-rays in nitrogen atmosphere, the frequency of the radiation was 30 EHz, the internal temperature of the mixture was 1100° C., and the treatment was performed for 3 hours;

4) the above material was ultrasonically washed with deionized water, and vacuum dried at 80° C. for 12 hours, to obtain a porous copper silicide intermetallic compound;

5) the acetylene hydrochlorination reaction was evaluated in a fixed bed reactor with reference to the method in Example 1: the acetylene hydrochlorination reaction was performed at 220° C., the acetylene space velocity was 40 h$^{-1}$, the molar ratio of hydrogen chloride: acetylene was 1.05:1, and when the reaction initially reached a stable state, the reaction conversion rate was 68% and the selectivity of vinyl chloride was 99%.

Comparative Example 3

1) 22.6 g of nano-silicon powder were added to 22 g of copper powder, and the mixture was processed in a planetary ball mill under air atmosphere at a ball milling speed of 20,000 rpm for 1 hour to fully mix the copper powder and the silicon powder;

2) the above mixture was placed in a microwave shaker for microwave digestion treatment, the frequency of the microwave digestion treatment was 1500 MHz, and the treatment time was 2 h;

3) the above mixture was placed in a tube furnace under nitrogen atmosphere, and calcined at a high temperature of 900° C. for 3 hours under nitrogen atmosphere.

4) the above material was ultrasonically washed with deionized water, and vacuum dried at 80° C. for 12 hours, to obtain a porous copper silicide intermetallic compound;

5) according to the method of Example 1, the acetylene hydrochlorination reaction was evaluated in the fixed bed reactor: the acetylene hydrochlorination reaction was carried out at 220° C., the acetylene space velocity was 40 h$^{-1}$, the molar ratio of hydrogen chloride:

acetylene was 1.05:1, and when the reaction initially reached a stable state, the reaction conversion rate was 47% and the selectivity of vinyl chloride was 99%.

The physical parameters of the materials prepared in the Examples 1-5 and Comparative Examples 1-3 were tested and analyzed, wherein the specific surface area and pore size distribution were measured using a specific surface area analyzer KuBox1000, the analysis method used for the specific surface area was BET, the micropore treatment method was HK method, the mesoporous treatment method is the BJH method, and elemental analysis was measured by XRF. The results are shown in Table 1.

acetylene space velocity of 40 $h^{-1}$, the effect of temperature on the catalytic activity of the catalyst was investigated. Then, the effect of acetylene space velocity on the catalytic activity of the catalyst was investigated at 180° C., and the results are shown in Table 2; it was found that when the acetylene hydrochlorination reaction was performed at 180° C., the acetylene space velocity was 40 $h^{-1}$, and the molar ratio of hydrogen chloride:acetylene was 1.05:1, the technical effect was the best, wherein the reaction conversion rate was 90.3% and the selectivity of vinyl chloride was 99% when the reaction initially reached a stable state.

TABLE 1

Physical parameters and catalytic performance evaluation of porous copper silicide intermetallic compound catalysts

| Example | specific surface area/ $m^2g^{-1}$ | elemental composition | ratio of micropores/% | ratio of mesopores/% | T for evaluation/° C. | acetylene space velocity/ $h^{-1}$ | conversion rate/% | selectivity/% |
|---|---|---|---|---|---|---|---|---|
| Example 1 | 382 | $Cu_{1.2}Si_{2.9}$ | 12 | 88 | 120 | 30 | 33.2 | 98.7 |
| | | | | | 140 | 30 | 55.9 | 98.3 |
| | | | | | 160 | 30 | 70.5 | 98.7 |
| | | | | | 180 | 30 | 79.5 | 99 |
| | | | | | 220 | 30 | 97.7 | 99.2 |
| | | | | | 260 | 30 | 86.8 | 99 |
| | | | | | 300 | 30 | 61.6 | 99 |
| | | | | | 220 | 60 | 91.1 | 99 |
| | | | | | 220 | 90 | 85.9 | 99 |
| | | | | | 220 | 180 | 75.3 | 99 |
| | | | | | 220 | 370 | 60.2 | 99 |
| Example 2 | 421 | $Cu_{3.3}Si_{0.8}$ | 28 | 72 | 280 | 70 | 92.7 | 99 |
| Example 3 | 500 | $Cu_{2.1}Si_{3.5}$ | 18 | 72 | 210 | 100 | 90.5 | 99 |
| Example 4 | 430 | $Cu_{2.4}Si_{0.1}$ | 25 | 75 | 270 | 370 | 95 | 98 |
| Example 5 | 456 | $Cu_{1.4}Si_3$ | 21 | 79 | 300 | 30 | 97.8 | 98 |
| Comparative Example 1 | 45 | $Cu_5Si$ | 10 | 90 | 230 | 50 | 12 | 99 |

The above conditions of the acetylene hydrochlorination reaction with the catalyst prepared in Examples 2-5 or Comparative Example 1 were all optimal reaction conditions.

Example 6

Figure 4:
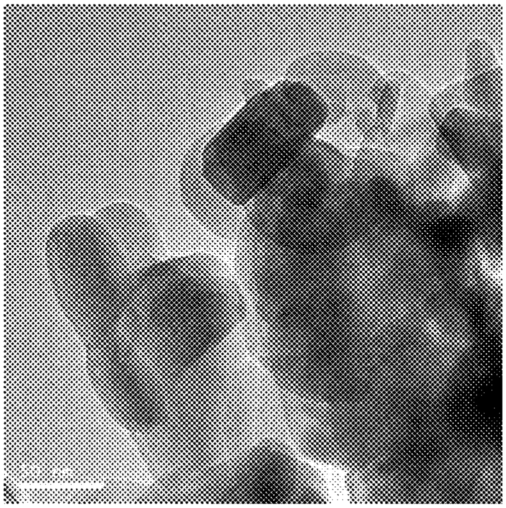
FIG. 4: Scanning electron microscope image of the material prepared in Example 6.

1) 24.6 g of sublimation sulfur were added to 20 g of copper powder, and the mixture was processed in a planetary ball mill under air atmosphere at a ball milling speed of 2000 rpm for 1 h to fully mix the copper source and the sulfur source;
2) the above mixture was placed in a microwave shaker for microwave digestion treatment, the frequency of the microwave digestion treatment was 300 MHz, and the treatment time was 2 h;
3) the above mixture was placed in a Joule heating furnace under nitrogen atmosphere, the temperature of the carbon thermal shock was 2200° C., the shock duration was 55 milliseconds, and the heating/cooling rate was 105° C. per second.
4) the above materials were ultrasonically washed with deionized water, and vacuum dried at 80° C. for 4 hours to obtain a porous copper-sulfur intermetallic material. The physical parameters are shown in Table 1, and the scanning electron microscope image is shown in FIG. 4;
5) evaluation of acetylene hydrochlorination reaction in a fixed bed reactor: the effects of temperature and space velocity on the catalytic performance of the catalyst were investigated respectively. Under the condition of Example 7

1) 17.5 g of 1,3-bis(thioacetic acid-S-n-propyl)imidazolium bromide and 5 ml of thioglycolic acid were added to 16 g of copper chloride dihydrate powder, the mixture was processed in a planetary ball mill under nitrogen atmosphere at a ball milling speed of 12000 rpm for 1 h to fully mix the copper source and the sulfur source;
2) the above mixture was placed in a microwave shaker for microwave digestion treatment, the frequency of the microwave digestion treatment was 800 MHz, and the treatment time was 2 h;
3) the above mixture was placed in a Joule heating furnace under nitrogen atmosphere, the temperature of the carbon thermal shock was 3200° C., the shock duration was 2500 milliseconds, and the heating/cooling rate was 1600° C. per second;
4) the above material was ultrasonically washed with deionized water, and vacuum dried at 100° C. for 12 hours to obtain a porous copper-sulfur intermetallic compound material, whose physical parameters are shown in Table 2;
5) evaluation of acetylene hydrochlorination reaction in a fixed bed reactor: the acetylene hydrochlorination reaction was carried out at 180° C., acetylene space velocity was 70 $h^{-1}$, the molar ratio of hydrogen chloride: acetylene was 1:1, and when the reaction initially reached a stable state, the reaction conversion rate was 93.9% and the selectivity of vinyl chloride was 99%.

Example 8

1) 15.2 g of selenium disulfide were added to 12 g of copper sulfide powder, and the mixture was processed in a planetary ball mill under argon atmosphere at a ball milling speed of 10000 rpm for 5 h, and thereby mixed thoroughly;
2) the above mixture was placed in a microwave shaker for microwave digestion treatment, the frequency of the microwave digestion treatment was 1200 MHz, and the treatment time was 3 h;
3) the above mixture was placed in a Joule heating furnace under nitrogen atmosphere, the temperature of the carbon thermal shock was 500° C., the shock duration was 150 milliseconds, and the heating/cooling rate was 500° C. per second;
4) the above material was ultrasonically washed with deionized water, and vacuum dried at 120° C. for 8 hours to obtain a porous copper-sulfur-selenium dual-phase intermetallic compound material, whose physical parameters are shown in Table 2;
5) evaluation of acetylene hydrochlorination reaction in a fixed bed reactor: the acetylene hydrochlorination reaction was carried out at 210° C., acetylene space velocity was 100 $h^{-1}$, the molar ratio of hydrogen chloride: acetylene was 1:1.1, and when the reaction initially reached a stable state, the reaction conversion rate was 95.2% and the selectivity of vinyl chloride was 99%.

Example 9

Figure 5:
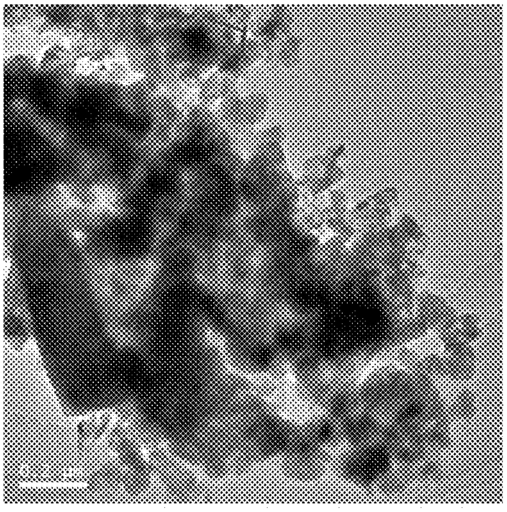
FIG. 5: Scanning electron microscope image of the material prepared in Example 9.
Figure 6:
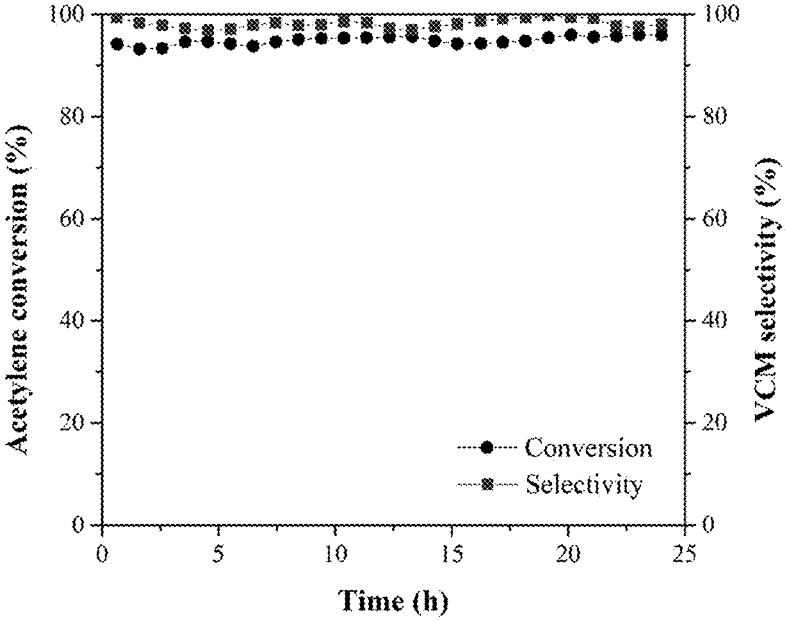
FIG. 6: Reaction performance diagram of the material prepared in Example 9.

1) 15.2 g of selenium telluride were added to 10 g of copper sulfate powder, and the mixture was processed in a planetary ball mill under argon atmosphere at a ball milling speed of 8000 rpm for 3 h, and thereby mixed thoroughly;
2) the above mixture was placed in a microwave shaker for microwave digestion treatment, the frequency of the microwave digestion treatment was 5000 MHz, and the treatment time was 4 h;
3) the above mixture was placed in a Joule heating furnace under nitrogen atmosphere, the temperature of the carbon thermal shock was 2500° C., the shock duration was 900 milliseconds, and the heating/cooling rate was 1000° C. per second.
4) the above material was ultrasonically washed with deionized water, and vacuum dried at 50° C. for 8 hours to obtain a porous copper-sulfur-selenide-tellurium three-phase intermetallic compound, whose physical parameters are shown in Table 2, and scanning electron microscope image is shown in FIG. 5;
5) evaluation of acetylene hydrochlorination reaction in a fixed bed reactor: the acetylene hydrochlorination reaction was carried out at 270° C., acetylene space velocity was 370 $h^{-1}$, the molar ratio of hydrogen chloride: acetylene was 1:12, and when the reaction initially reached a stable state, the reaction conversion rate was 95% and the selectivity of vinyl chloride was 98%, and the stability is shown in FIG. 6.

Example 10

1) 11 g of selenium powder and 10 ml of 40 wt % selenic acid solution were added to 10 g of copper acetate powder, and the mixture was processed in a planetary ball mill under argon atmosphere at a ball milling speed of 100 rpm for 4 h, and thereby mixed thoroughly;

2) the above mixture was placed in a microwave shaker for microwave digestion treatment, the frequency of the microwave digestion treatment was 300 GHz, and the treatment time was 1 h;
3) the above mixture was placed in a Joule heating furnace under nitrogen atmosphere, the temperature of the carbon thermal shock was 1000° C., the shock duration was 3000 milliseconds, and the heating/cooling rate was 1500° C. per second;
4) the above material was ultrasonically washed with deionized water, and vacuum dried at 90° C. for 8 hours to obtain a porous copper-selenium intermetallic compound, whose physical parameters are shown in Table 2;
5) evaluation of acetylene hydrochlorination reaction in a fixed bed reactor: the acetylene hydrochlorination reaction was carried out at 300° C., acetylene space velocity was 30 $h^{-1}$, the molar ratio of hydrogen chloride: acetylene was 0.9:1.2, and when the reaction initially reached a stable state, the reaction conversion rate was 98.4% and the selectivity of vinyl chloride was 99%.

Example 11

1) 11 g of selenium telluride powder were added to 12 g of cuprous oxide powder, and the mixture was processed in a planetary ball mill under helium atmosphere at a ball milling speed of 12000 rpm for 5 h and thereby mixed thoroughly;
2) the above mixture was placed in a microwave shaker for microwave digestion treatment, the frequency of the microwave digestion treatment was 100 GHz, and the treatment time was 1.2 h;
3) the above mixture was placed in a Joule heating furnace under nitrogen atmosphere, the temperature of the carbon thermal shock was 1200° C., the shock duration was 1500 milliseconds, and the heating/cooling rate was 1000° C. per second;
4) the above material was ultrasonically washed with deionized water and vacuum dried at 120° C. for 8 hours to obtain a porous copper-selenide-tellurium dual-phase intermetallic compound, whose physical parameters are shown in Table 2;
5) evaluation of acetylene hydrochlorination reaction in a fixed bed reactor: the acetylene hydrochlorination reaction was carried out at 150° C., acetylene space velocity was 60 $h^{-1}$, the molar ratio of hydrogen chloride: acetylene was 0.9:1, and the reaction conversion rate was 97.9% and the selectivity of vinyl chloride was 98% when the reaction initially reached a stable state.

Comparative Example 4

The fixed bed reactor was charged with copper sulfide purchased from Aladdin, and the acetylene hydrochlorination reaction was evaluated under the following conditions: the reaction temperature was 230° C., the acetylene space velocity was 50 $h^{-1}$, and the molar ratio of hydrogen chloride:acetylene was 1:1.2. When the reaction initially reached a stable state, the reaction conversion rate was 23% and the selectivity of vinyl chloride was 96.7%.

Comparative Example 5

The fixed bed reactor was charged with copper selenide purchased from Aladdin, and the acetylene hydrochlorination reaction was evaluated under the following conditions:

the reaction temperature was 150° C., acetylene space velocity was 30 $h^{-1}$, and the molar ratio of hydrogen chloride:acetylene was 1:1.1. When the reaction initially reached a stable state, the reaction conversion rate was 13% and the selectivity of vinyl chloride was 98.8%.

Comparative Example 6

According to Example 1 of the patent CN 201910783911.9, a copper sulfide triangular nanosheet material was prepared and used as the catalyst of the acetylene hydrochlorination reaction, and the acetylene hydrochlorination reaction was evaluated in the fixed bed reactor under the following conditions: the reaction temperature was 180° C., the acetylene space velocity was 40 $h^{-1}$, and the molar ratio of hydrogen chloride:acetylene was 1.05:1. When the reaction initially reached a stable state, the reaction conversion rate was 19% and the selectivity of vinyl chloride was 89%.

Comparative Example 7

According to Example 1 of the patent CN 202010644330.X, a rod-shaped nano-copper sulfide material was prepared and used as the catalyst of the acetylene hydrochlorination reaction, and the acetylene hydrochlorination reaction was evaluated in the fixed bed reactor under the following conditions: the reaction temperature was 180° C., the acetylene space velocity was 40 $h^{-1}$, and the molar ratio of hydrogen chloride:acetylene was 1.15:1. When the reaction initially reached a stable state, the reaction conversion rate was 23% and the selectivity of vinyl chloride was 86%.

Comparative Example 8

1) 11 g of selenium powder and 10 ml of 40 wt % selenic acid solution were added to 10 g of copper acetate powder, the mixture was processed in a planetary ball mill under argon atmosphere at a ball milling speed of 100 rpm for 4 h, and thereby mixed thoroughly;
2) the above mixture was placed in a microwave shaker for microwave digestion treatment, the frequency of the microwave digestion treatment was 300 GHz, and the treatment time was 1 h;
3) the above mixture was irradiated with X-rays in a nitrogen atmosphere, the frequency of the radiation was 30 EHz, the internal temperature of the mixture was 1100° C., and the treatment was performed for 3 hours.
4) the above material was ultrasonically washed with deionized water, and vacuum dried at 90° C. for 8 hours to obtain a porous copper-selenium intermetallic compound, whose physical parameters are shown in Table 2;
5) evaluation of acetylene hydrochlorination reaction in a fixed bed reactor: the acetylene hydrochlorination reaction was carried out at 300° C., acetylene space velocity was 30 $h^{-1}$, the molar ratio of hydrogen chloride: acetylene was 0.9:1.2, and when the reaction initially reached a stable state, the reaction conversion rate was 62% and the selectivity of vinyl chloride was 99%.

Comparative Example 9

1) 11 g of selenium powder and 10 ml of 40 wt % selenic acid solution were added to 10 g of copper acetate powder, and the mixture was processed in a planetary ball mill under argon atmosphere at a ball milling speed of 100 rpm for 4 h, and thereby mixed thoroughly;
2) the above mixture was placed in a microwave shaker for microwave digestion treatment, the frequency of the microwave digestion treatment was 300 GHz, and the treatment time was 1 h;
3) the above mixture was placed in a tube furnace under nitrogen atmosphere, and calcined at a high temperature of 900° C. for 3 hours under nitrogen atmosphere.
4) the above material was ultrasonically washed with deionized water, and vacuum dried at 90° C. for 8 hours to obtain a porous copper-selenium intermetallic compound, whose physical parameters are shown in Table 2;
5) evaluation of acetylene hydrochlorination reaction in a fixed bed reactor: the acetylene hydrochlorination reaction was carried out at 300° C., acetylene space velocity was 30 $h^{-1}$, the molar ratio of hydrogen chloride: acetylene was 0.9:1.2, and when the reaction initially reached a stable state, the reaction conversion rate was 52% and the selectivity of vinyl chloride was 98%.

The physical parameters of the materials prepared in the examples 6-11 and comparative examples 4-7 were tested and analyzed, wherein the specific surface area and pore size distribution were measured using Beijing Biode specific surface area analyzer KuBox1000, the analysis method used for the specific surface area was BET, the micropore treatment method was the HK method, the mesoporous treatment method is BJH method, and elemental analysis was measured by XRF. The results are shown in Table 2.

TABLE 2

Physical parameters and catalytic performance evaluation of porous copper-chalcogen intermetallic compound catalysts

| Example | specific surface area/ $m^2g^{-1}$ | elemental composition | ratio of micropores/% | ratio of mesopores/% | T for evaluation/° C. | acetylene space velocity/ $h^{-1}$ | conversion rate/% | selectivity/% |
|---|---|---|---|---|---|---|---|---|
| Example 6 | 583 | $Cu_{2.2}S_{1.9}$ | 66 | 34 | 100 | 40 | 63.9 | 98.7 |
| | | | | | 130 | 40 | 75.2 | 98.3 |
| | | | | | 160 | 40 | 80.3 | 98.7 |
| | | | | | 180 | 40 | 90.3 | 99 |
| | | | | | 220 | 40 | 85.7 | 99.2 |
| | | | | | 260 | 40 | 68.8 | 98.4 |
| | | | | | 300 | 40 | 61.6 | 98.8 |
| | | | | | 180 | 30 | 87.6 | 98.2 |
| | | | | | 180 | 90 | 81.1 | 98.5 |
| | | | | | 180 | 180 | 75.9 | 98.1 |
| | | | | | 180 | 360 | 73.5 | 98.3 |

TABLE 2-continued

Physical parameters and catalytic performance evaluation of porous copper-chalcogen intermetallic compound catalysts

| Example | specific surface area/ $m^2g^{-1}$ | elemental composition | ratio of micropores/% | ratio of mesopores/% | T for evaluation/° C. | acetylene space velocity/ $h^{-1}$ | conversion rate/% | selectivity/% |
|---|---|---|---|---|---|---|---|---|
| | | | | | 180 | 740 | 70.1 | 98.1 |
| Example 7 | 1321 | $Cu_{3.8}S_{0.9}$ | 72 | 28 | 180 | 70 | 93.9 | 99 |
| Example 8 | 891 | $Cu_{2.8}S_{2.1}Se_{2.8}$ | 68 | 32 | 210 | 100 | 95.2 | 99 |
| Example 9 | 1600 | $Cu_{2.7}S_{0.6}Se_{0.9}Te_{1.8}$ | 25 | 75 | 270 | 370 | 95 | 98 |
| Example 10 | 1200 | $Cu_{1.4}Se_3$ | 9 | 91 | 300 | 30 | 98.4 | 98 |
| Example 11 | 1166 | $Cu_{1.2}Se_{2.9}Te_{2.7}$ | 52 | 48 | 150 | 60 | 97.9 | 98 |
| Comparative Example 4 | 170 | CuS | 63 | 37 | 230 | 50 | 23 | 96.7 |
| Comparative Example 5 | 230 | CuSe | 21 | 79 | 180 | 40 | 13 | 97.2 |
| Comparative Example 6 | 99 | $Cu_{1.3}S_{1.7}$ | 53 | 47 | 180 | 40 | 19 | 89 |
| Comparative Example 7 | 169 | $Cu_{1.5}S_{2.1}$ | 12 | 88 | 180 | 40 | 23 | 86 |

The above conditions of the acetylene hydrochlorination reaction with the catalyst prepared in Examples 7-11 or Comparative Examples 4-7 were all optimal reaction conditions.

We claim:

1. A method for synthesizing vinyl chloride via acetylene hydrochlorination reaction, comprising:

introducing raw material gases hydrogen chloride and acetylene into a fixed-bed reactor loaded with a porous intermetallic compound as a catalyst; and performing the reaction at a reaction temperature of 80-400° C. to generate vinyl chloride, wherein: the pore structure of the porous intermetallic compound includes micropores and mesopores, and the micropores and mesopores are distributed in disorder, wherein content of the micropores accounts for 6-68%, and content of the mesopores accounts for 32-92%; specific surface area of the porous intermetallic compound is 50-1600 $m^2/g$; the porous intermetallic compound is a porous copper silicide intermetallic compound or porous copper-chalcogen intermetallic compound; in the porous copper silicide intermetallic compound, molar ratio of copper to silicon is 0.4~25:1; in the porous copper-chalcogen intermetallic compound, chalcogen is one or more of sulfur, selenium and tellurium, and chemical formula of the porous copper-chalcogen intermetallic compound is $Cu_xS_ySe_mTe_n$, wherein $x>0$, $y\geq0$, $m\geq0$, $n\geq0$, and molar ratio of copper to chalcogen $x/(y+m+n)=1:0.01\sim5$.

2. The method of claim 1, wherein in the porous copper silicide intermetallic compound, the content of micropores accounts for 10-40%, and the content of mesopores accounts for 60-90%.

3. The method of claim 1, wherein the molar ratio of copper to silicon in the porous copper silicide intermetallic compound is 0.4-5:1.

4. The method of claim 1, wherein the specific surface area of the porous copper silicide intermetallic compound is 400-600 $m^2/g$.

5. The method of claim 1, wherein in the porous copper-chalcogen intermetallic compound, the molar ratio of copper to chalcogen is 1:0.2-5.

6. The method of claim 1, wherein the porous intermetallic compound is obtained by a preparation method which comprises the following steps:

1) mixing a copper precursor with compound A, wherein mass ratio of the precursor to the compound A is 1:0.8~1.55, placing resulting mixture in an inert atmosphere or air atmosphere, and fully grinding it in a planetary ball mill; wherein the compound A is a silicon-containing compound or an inorganic or organic chalcogen-containing compound;

2) putting the ground material obtained in step 1) into a constant temperature microwave shaker for microwave digestion treatment, wherein frequency of the microwave digestion treatment is 300 MHz~300 GHz, and treatment time is 0.1~24 h;

3) placing the mixture obtained in step 2) in a Joule heating furnace under an inert gas atmosphere for rapid heating and cooling treatment by carbon thermal shock method, in which temperature of the carbon thermal shock is 200~3200° C., duration of the shock is 0.05-3 seconds, and heating/cooling rate is 10~2000° C. per second;

4) placing the material obtained in step 3) in deionized water for ultrasonic washing, and then subjecting the material to vacuum drying to obtain the porous intermetallic compound.

7. The method of claim 6, wherein in step 1), the copper precursor is selected from at least one of copper powder, copper chloride, copper nitrate, copper sulfate, copper oxide, cuprous oxide, copper hydroxide, copper phosphide, copper sulfide, copper selenide, and copper acetate, wherein the silicon-containing compound is selected from one or more of nano-silica powder, diatomaceous earth, silicon acetate, trimethylsilimidazole, silicon dioxide, silica, silicic acid, and boron silicide, and wherein the chalcogen-containing compound is selected from one or more of inorganic and organic compounds containing sulfur, selenium and/or tellurium.

8. The method of claim 7, wherein the chalcogen-containing compound is selected from one or more of thioglycolic acid, thioacetamide, 1,3-bis (thioacetic acid-S-n-propyl) imidazolium bromide, propanethiol, 2-propylthiol, sodium methanethiolate, n-butyl mercaptan, allyl mercaptan, n-dodecane mercaptan, cyclohexane mercaptan, methyl sulfide, methyl ethyl sulfide, thiourea, sulfur tetrachloride, sulfuric acid, sodium sulfide, tin sulfide, tungsten sulfide, selenium disulfide, phosphorus pentasulfide, sublimated sulfur, silicon sulfide, tellurium disulfide, selenium telluride, dimethyl selenium, selenophene, dimethyl diselenide, selenium tetrachloride, selenophene, triphenylphosphine selenide, selenium powder, copper selenide, selenium dioxide, selenium acid solution, iron selenide, selenium disulfide, selenium telluride, di-tert-butyl tellurium, diphenyl tellurium, diethyl tellurium, tellurium tetrachloride, tellurium isopropanol, tellurium powder, tellurium oxide, copper telluride, ammonium tellurate, telluric acid, tellurium disulfide, and selenium telluride.

9. The method of claim 6, wherein the porous intermetallic compound is a porous copper silicide intermetallic compound, in step 1), the ball milling speed is 100-100,000 rpm, and the ball milling time is 0.5-24 h.

10. The method of claim 6, wherein the porous intermetallic compound is a porous copper-chalcogen intermetallic compound, in step 1), the ball milling speed is 100-12000 rpm, and the ball milling time is 0.5-5 h.

11. The method of claim 10, wherein the ball milling speed is 2000~12000 rpm, and the ball milling time is 1~5 h.

12. The method of claim 6, wherein the porous intermetallic compound is a porous copper-chalcogen intermetallic compound, in step 2), the frequency of the microwave digestion treatment is 300 MHz-300 GHz, and the treatment time is 1-5 h.

13. The method of claim 6, wherein the porous intermetallic compound is a porous copper-chalcogen intermetallic compound, in step 3), the temperature of the carbon thermal shock method is 500-3200° C., the shock duration is 0.1-3 seconds, and the heating/cooling rate is 100-2000° C. per second.

14. The method of claim 6, wherein the temperature of vacuum drying in step 4) is 80-120° C., and the time of vacuum drying is 2-12 h.

15. The method of claim 1, wherein the porous copper silicide intermetallic compound is obtained by a method which comprises the following steps:

a) mixing a copper-containing precursor with a silicon-containing compound, wherein mass ratio of the precursor to the silicon-containing compound is 1:0.8~1.4, and then subjecting obtained mixture to microwave digestion treatment to obtain a silicon-copper skeleton material, wherein frequency of the microwave digestion treatment is 300 MHz~300 GHz, and treatment time is 0.1-24h;

b) subjecting the silicon-copper skeleton material to a solid-state electrolysis process in an electrolytic cell, and collecting cathode deposits to obtain the porous copper silicide intermetallic compound; wherein an electrolyte is NASICON oxide solid electrolyte, an electrode anode is made of CW104C copper alloy, a cathode is made of carbon nanofibers, electrolysis time of the solid-state electrolysis process is 0.5~3 h, and current density is 10-500 $mA \cdot cm^{-2}$.

16. The method of claim 15, wherein in step a), the treatment time is 0.5-5 h.

17. The method of claim 15, wherein in step b), the electrolysis time is 0.5-3 h, and the current density is 100-500 $mA \cdot cm^{-2}$.

* * * * *